3,105,032
NUCLEAR REACTORS
Stanley Hackney, Fearnhead, near Warrington, England, assignor to United Kingdom Atomic Energy Authority, London, England
Filed Aug. 17, 1959, Ser. No. 834,040
Claims priority, application Great Britain Sept. 1, 1958
4 Claims. (Cl. 204—193.2)

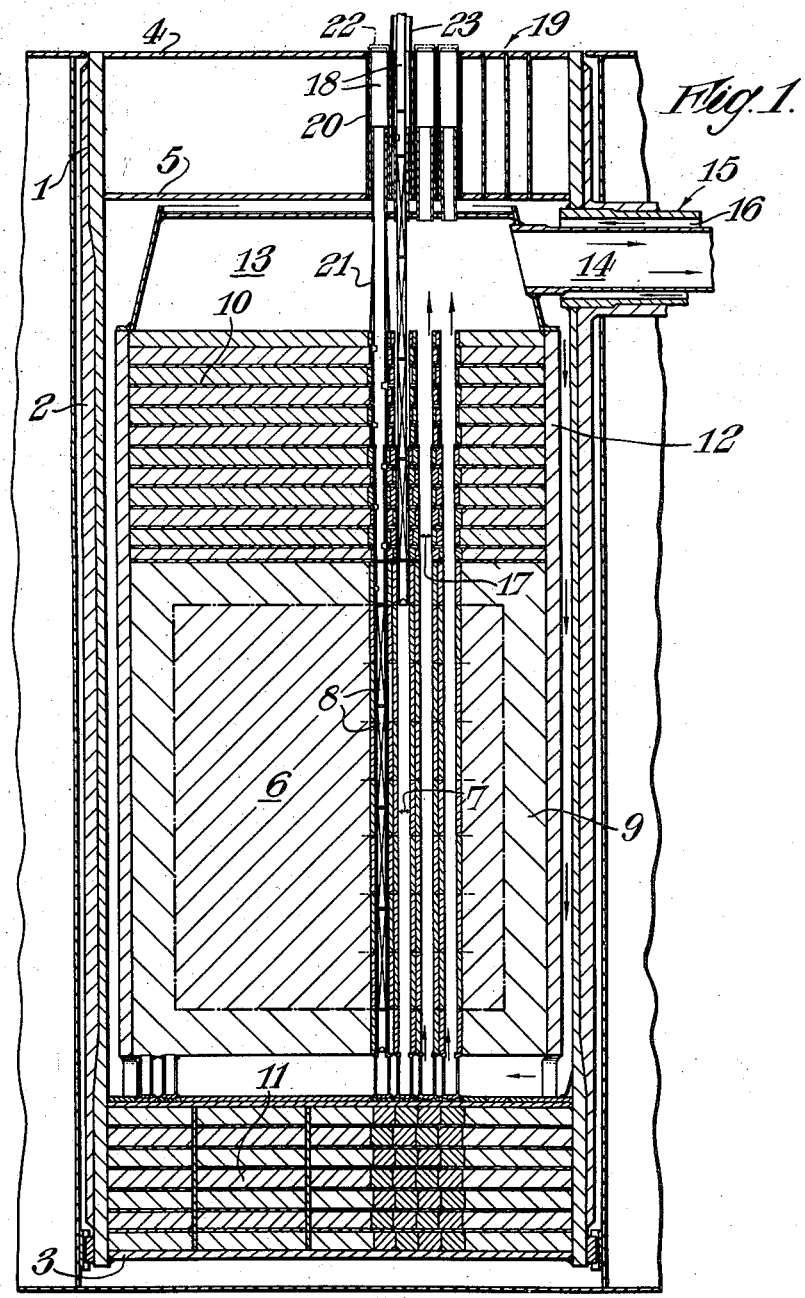

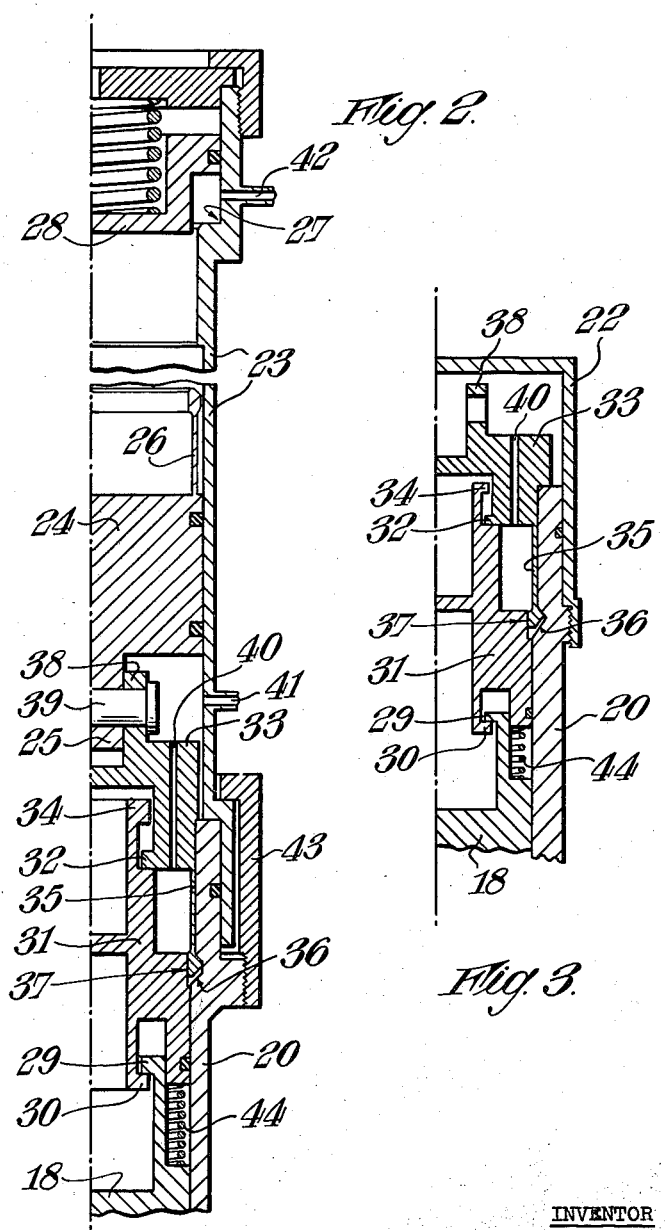

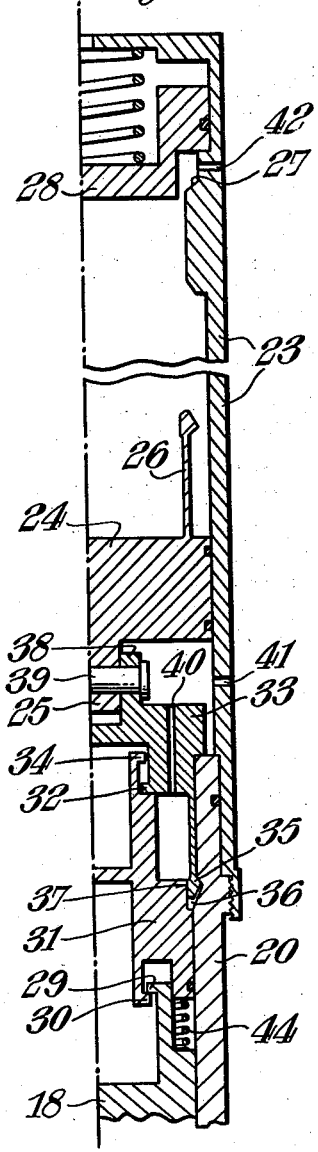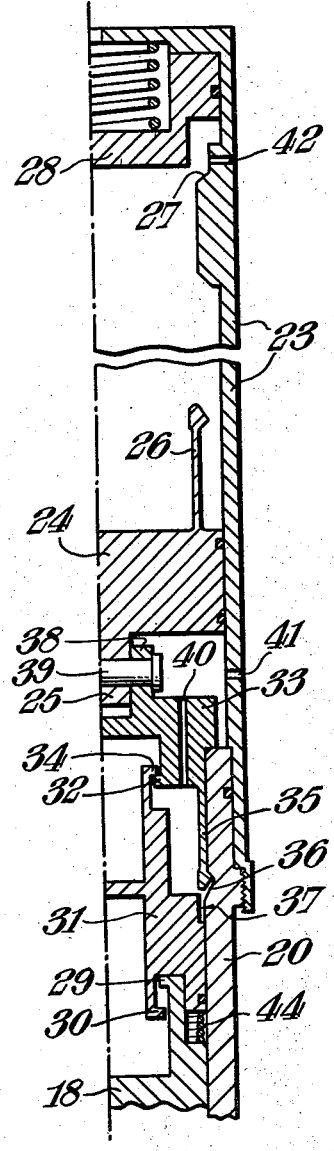

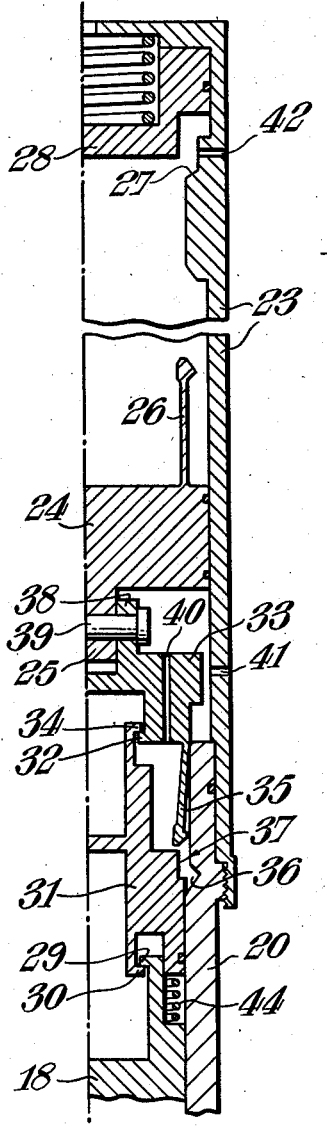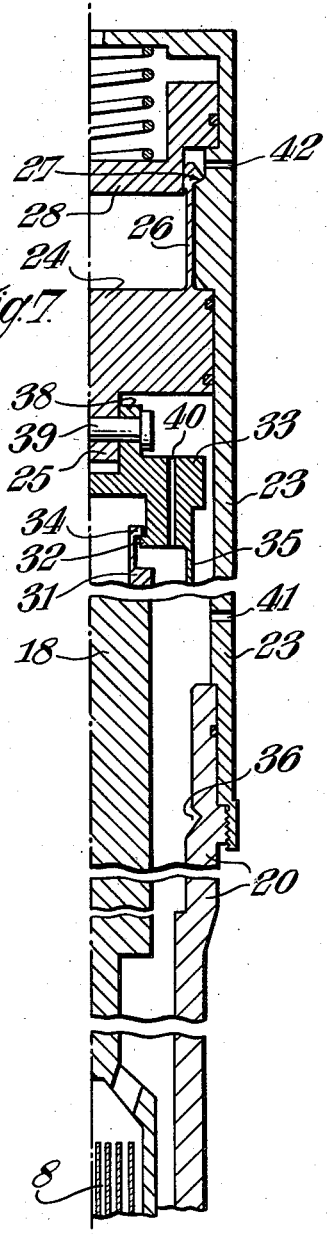

This invention relates to nuclear reactors, and is particularly concerned with manipulation of the fuel elements thereof.

Charging and discharging machines, particularly where charging and discharging under pressure circulation of coolant is required, are of necessity extremely massive and consequently occupy a large space which could well be otherwise employed, particularly during the periods when the machine or machines are not in actual use. It would be desirable therefore if the charging and discharging machines could be brought into operative position for only the period during which it or they are required to operate and then removed entirely from the reactor until again needed. However, if a fuel element were to become damaged during the period when the discharge machine was not in operative position, there should be provision for removing the damaged fuel element from the reactor core both on account of the damage and of prejudice to the subsequent detection of other damaged fuel elements should the damaged fuel element be allowed to remain in the core.

According to the invention, a nuclear reactor having a pressure vessel containing a reactor core, fuel element channels orientated in the core, shielding for the core, access tubes projecting through the pressure vessel and shielding to give access to one or more fuel element channels, and a shield plug in each access tube, is characterised in that the shield plug associated with each fuel element channel or group of channels is connected to a fuel element or to connected fuel elements adapted to occupy the said channel or any or all of the said group of channels, whereby withdrawal of a selected shield plug from its normal position in the respective access tube causes withdrawal of the fuel element or elements connected thereto from the reactor core.

Withdrawal of a shield plug may be effected by employment of pressure operated means associated with a cap or cowl connectable to the access tube containing the particular shield plug and forming an extension of the access tube.

The said cap or cowl preferably contains a pressure-operated piston which can be connected to the particular shield plug required to be withdrawn, the piston being operable to withdraw the shield plug sufficiently to withdraw the fuel element or elements connected thereto from the reactor core into a shielded position whilst still retaining the fuel element or elements in contact with coolant.

In order that the invention may be fully understood and more readily carried into practice, a constructional example thereof will now be particularly described with reference to the accompanying drawings in which:

FIGURE 1 is a side view in section of a nuclear reactor.

FIGURE 2 is a side half view in medial section of a detail.

FIGURES 3–7 are diagrammatic views similar to FIGURE 2, showing parts in sequential relative positions.

Figure 8:
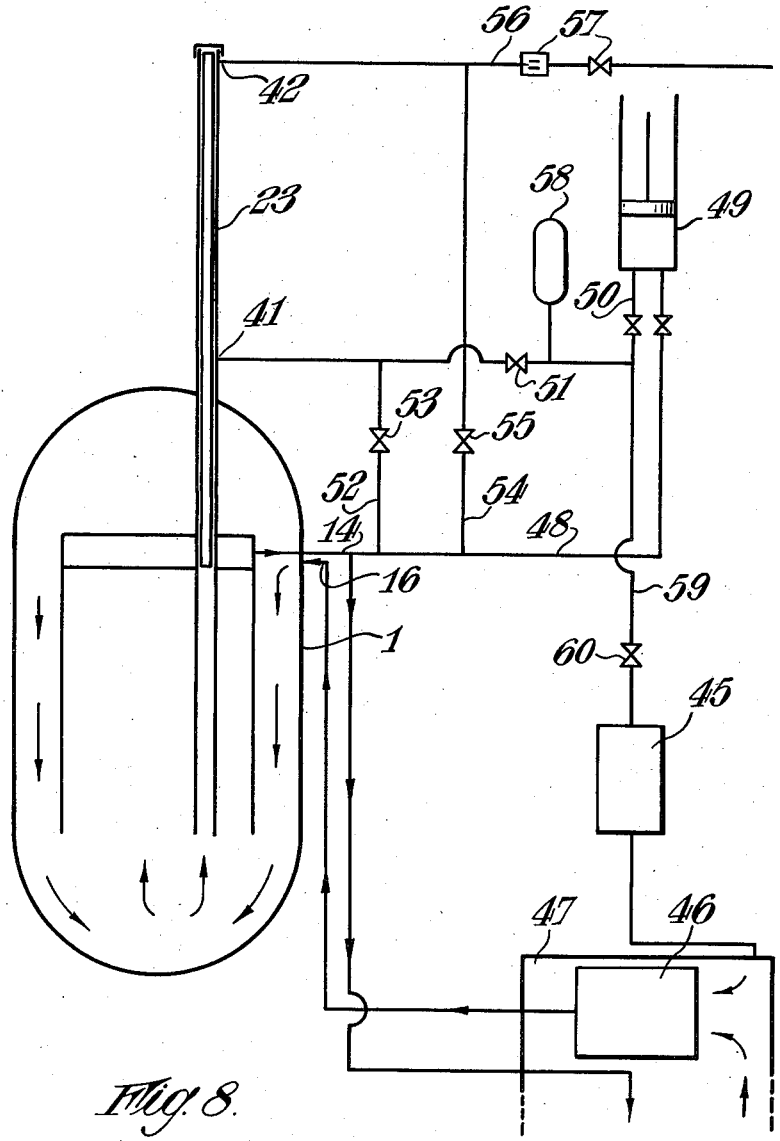
FIGURE 8 is a gas circuit diagram.

Referring to the drawings, in the construction shown therein, as applied by way of example to a gas-cooled graphite-moderated nuclear reactor as shown in FIGURE 1, the reactor has a cylindrical pressure vessel 1 having a side wall 2, a base 3 and a top formed by two spaced ends 4 and 5. The pressure vessel 1 contains a core 6 having vertical channels 7 for interconnected fuel elements 8 (shown diagrammatically), the core being surrounded by a reflector 9 and having upper and lower neutron shields 10 and 11 respectively. A thermal shield 12 contains the core 6, reflector 9 and neutron shields 10 and 11 and has a header 13 for hot coolant from the fuel element channels 7. The inner duct 14 of coaxial ducting 15 connects the hot header 13 to one or more heat exchangers (one being shown diagrammatically in FIGURE 8 and designated 47), the return flow of coolant from the heat exchanger(s) being caused by a circulator (shown diagrammatically in FIGURE 8 and designated 46) to flow through the annular duct 16 of the ducting 15 into the pressure vessel 1, downwardly between the wall 2 and thermal shield 12 and upwardly through the fuel element channels 7 of the core, through registering channels 17 in the upper neutron shield 10 and into the header 13.

Each train of connected fuel elements has a neutron shield plug 18 connected to it and serving to complete the neutron shield 10 when the fuel elements are in their normal position in the core by presenting neutron absorbing obstacles to the straight line path of neutrons whilst at the same time allowing coolant to pass through the channels 17 between the walls thereof and the respective shield plug 18 in a somewhat tortuous manner.

The reactor is intended to operate on the principle of extended periods of fuel burn-up between charge and discharge, and consequently has no charge/discharge machine permanently in position at the charge face 19. Access tubes 20 extending between the ends 4 and 5 and having portions 21 extending from the end 5 to the neutron shield 10 and traversing the header 13, are normally closed by end caps 22 during the periods between refuelling. However, if a fuel element becomes damaged during such periods when there is no charge/discharge machine present to withdraw it from the reactor core, the coolant can become activated to an undesirable and dangerous extent, such as to cause a hazard to personnel should a leak or breach then develop in the coolant circuit. Furthermore, the presence of a damaged fuel element in the core is likely to prejudice the detection of any subsequently damaged elements with the presently known detector gear. Provision is therefore made for partially withdrawing a train of fuel elements 8 containing a damaged element once the latter has been detected and the train containing it identified. The train can be withdrawn into the position illustrated in FIGURE 1 wherein the fuel elements 8 are partly contained within the neutron shield 10 and partly within the corresponding access tube 20 and its extended portion 21. Furthermore, provision is made for maintaining a coolant flow over the partly withdrawn fuel elements, partly to dissipate fission product heating and partly to establish a branch coolant circuit in which a filter can be provided for removing any radio-active particles entrained in the coolant from the damaged fuel element. The train containing the damaged fuel element can be safely maintained in this position pending availability of a charge/discharge machine for effecting full withdrawal and replacement by a new train of fuel elements or a train from which the damaged element has been removed and replaced.

Apparatus for effecting the said partial withdrawal is shown in FIGURES 2–7 (FIGURES 3–7 being diagrammatic) and includes an extended cap 23 intended to replace the normal end cap 22 on the respective access tube 20 when partial withdrawal becomes necessary. The cap 23 contains a piston 24 provided with a shackle 25 at its lower end. The piston has an upwardly extending locking piece 26 engageable in a notch 27 at the upper end of the cap, a spring loaded plunger 28 being movable to lock the locking piece 26 in engagement with the notch 27 to hold the piston 24 in its uppermost position in the cap 23. The said apparatus also includes an inwardly extending lip 29 at the upper end of each shield plug 18 engageable with lost motion by an outwardly extending lip 30 at the lower end of a sealing plunger 31 in each access tube 20, and an inwardly extending lip 32 at the lower end of a locking member 33 engageable with lost motion by an outwardly extending lip 34 at the upper end of the plunger 31, the locking member 33 having a springy locking piece 35 which is normally in engagement with a notch 36 in the access tube 20 and locked in this position by a shoulder 37 on the plunger 31. The locking member 33 also has a shackle 38 which can be secured to the shackle 25 of the piston 24 by a shackle pin 39, and furthermore has a gas passage 40 or passages extending vertically through it. The cap 23 has a lateral gas port 41 near its lower end and a lateral gas port 42 near its upper end. The cap 23 can be sealed on the access tube 20 by means of a screwed sleeve 43.

The operation of the apparatus can best be described by reference to FIGURES 3 to 7. FIGURE 3 shows the access tube 20 with its normal end cap 22 in position for normal operation of the reactor. The shield plug 18 and parts 31 and 33 are normally in the position shown with the locking piece 35 held in engagement with the notch 36 by the shoulder 37 of the plunger 31, the plunger 31 being retained in its locking position by the action of a compression spring 44 between the shield plug 18 and plunger 31, and also by the pressure of coolant acting upwardly on it. When partial withdrawal becomes necessary, the cap 22 is replaced (see FIGURE 4) by the extended cap 23 (the plunger 31 sealing against the access tube 20 and preventing escape of coolant during this change), the shackles 25 and 38 are connected by engagement (remotely effected) of the shackle pin 39, and reactor coolant at reactor pressure is connected to ports 41 and 42. The only effect of the coolant connection is to lift the locking plunger 28 against its spring pressure. The plunger 31 does not move because it is subjected to equal coolant pressures at its top and bottom, plus the pressure of the compression spring 44 which causes it to remain in its upper position as shown in FIGURE 4. The piston 24 likewise does not move because it is subjected to equal pressures at both sides. The next move in the sequence of operation is to increase the pressure of the coolant supplied to port 41 to above that of reactor coolant, for example 15 lbs. per sq. in. above reactor pressure. The effect of this is shown in FIGURE 5. Initially, piston 24 cannot move, although it is being subjected to greater pressure below than above it, because it is held by locking member 33 whose locking piece 35 is held in notch 36. Pressure from port 41 reaches plunger 31 via the gas passage and is sufficient to overcome the upward pressure of compression spring 44 causing the plunger 31 to move downwardly into its lower position (its travel being limited by its lip 34 and by the top of the shield plug 18) which removes the shoulder 37 from engagement with the locking piece 35, the latter moving out of engagement with the notch 36 due to the upward pull exerted on it by its connection to the piston 24 which is being subjected to greater pressure below than above it. This frees the piston 24 for upward travel. FIGURE 6 shows the upward travel of the piston 24 having commenced, entraining the locking member 33 and plunger 31, and, once the lost motion between plunger 31 and shield plug 18 has been taken up, the shield plug 18 itself. Once the locking piece 35 has become disengaged from the notch 36, pressure at port 41 can be reduced to reactor pressure and pressure at port 42 progressively reduced from reactor pressure.

Once the plunger 31 has ceased to seal with the access tube 20, port 41 is connected to the coolant circuit circulator via a filter 45 (see FIGURE 8), since coolant pressure from the reactor directly up the access tube 20 will continue to drive the piston 24 upwardly, the filter 45 serving to remove any particles from the damaged fuel element which have become entrained in the coolant. When the piston 24 has reached its uppermost position, pressure at port 42 is reduced to atmospheric, and the plunger 28 is moved downwardly by the action of its spring to hold the locking piece 26 in engagement with the notch 27 positively to lock the piston 24, and hence the shield plug 18 and connected train of fuel elements 8, in the position of partial withdrawal of the train of fuel elements aforesaid.

FIGURE 8 shows in diagram form a suitable gas circuit for carrying out the steps in the sequence of operation just described. The circulator 46 associated with the heat exchanger 47 normally drives coolant along duct 16 to the pressure vessel 1 for circulation as aforesaid. Hot coolant leaves the pressure vessel 1 by duct 14 for returning to the heat exchanger 47. The duct 14 has a branch 48 leading to a compressor 49, the valved outlet 50 from which communicates with port 41 via a valve 51. A by-pass 52 with valve 53 is provided so that the duct 14 can be directly connected to port 41. Another by-pass 54 with valve 55 serves to connect duct 14 to port 42, and a branch 56 and blow-off valve 57 leads from port 42 for progressive depressurising. A tank 58 is connected to the compressor outlet for storing of pressure, and a branch 59 with valve 60 leads from the compressor outlet to the filter 45 and thence to the circulator 46. It will be seen that by suitable manipulation of the valves, all the pressure applying and changing steps outlined above can be affected.

The invention is of particular application to a reactor intended for marine use, where it is intended that charging and discharging of fuel be only effected whilst the ship carrying the reactor is in port, a charge/discharge machine being available at the port for servicing a number of marine-borne reactors and no charge/discharge machine being carried by a ship.

I claim:

1. Pneumatically operated means for a gas-cooled nuclear reactor, said reactor having a pressure vessel containing a reactor core, fuel element channels vertically orientated in said core, fuel element trains in said channels, shielding for said core, access tubes projecting through said pressure vessel and shielding to give access to said fuel element channels, removable caps for closing the upper ends of said access tubes, shield plugs in said access tubes and connected to said fuel element trains, releasable locking members for holding said plugs in said access tubes, and said pneumatically operated means comprising a detachable tubular extension adapted to replace the removable cap closing a selected access tube, and a pneumatically operated piston slidable in said extension for effecting withdrawal, on release of the releasable locking member in said selected access tube, of the shield plug in said selected access tube into said extension and consequent withdrawal of the connected fuel element train from said core.

2. Pneumatically operated means for a gas cooled nuclear reactor according to claim 1 wherein reactor coolant is employed for operation of said pneumatically operated means.

3. Pneumatically operated means for a gas cooled nuclear reactor, said reactor having a pressure vessel containing a reactor core, fuel element channels orientated in the core, shielding for the core, access tubes projecting through the pressure vessel and shielding to give access to fuel element channels, a shield plug in each access tube, and an assembly of at least one fuel element connected to each shield plug so that withdrawal of a selected plug from its normal position in the respective access tube causes withdrawal, from the reactor core, of the fuel element assembly connected thereto; and said pneumatically operated means being associated with a detachable extension of the respective access tube for effecting withdrawal of the selected plug into said detachable extension and including a double acting piston normally contained in said extension for detachable connection to a locking member normally provided in said access tube, releasable latching means of said locking member for engagement with said access tube, a sealed plunger in said access tube connected with lost motion to said locking member and also connected to the shield plug of said access tube with lost motion, valve means for communication between reactor coolant at controlled pressure and the interior of said extension below said piston, said locking member having a passage so that reactor coolant in said extension below said piston to operate on said sealed plunger, means for communication between reactor coolant at controller pressure and the interior of said extension above said piston, and releasable latching means, operated by coolant pressure in said extension above said piston, for retaining said piston in a position in which application of coolant pressure to it has caused it to travel along said extension and withdraw the said shield plug connected to it via the sealed plunger and locking member.

4. Pneumatically operated means according to claim 3 wherein said lost motion connection between said sealed plunger and the piston and shield plug is effective for release of the latch means of said locking member, which is normally held in an engaged position by said sealed plunger, on application of pressure to said piston to effect withdrawal of said shield plug from said access tube.

References Cited in the file of this patent

UNITED STATES PATENTS

| | | |
|---|---|---|
| 2,851,410 | Vernon et al. | Sept. 9, 1958 |
| 2,868,706 | Untermeyer et al. | Jan. 13, 1959 |

FOREIGN PATENTS

| | | |
|---|---|---|
| 1,045,003 | Germany | Nov. 27, 1958 |